United States Patent
Oshima et al.

(10) Patent No.: US 8,147,565 B2
(45) Date of Patent: Apr. 3, 2012

(54) METHOD FOR MANUFACTURING ELECTRODE PLATE FOR BATTERY

(75) Inventors: Kenichi Oshima, Hyogo (JP); Kyoushige Shimizu, Osaka (JP); Hideo Hori, Kanagawa (JP)

(73) Assignee: Panasonic Corporation, Osaka (JP)

( * ) Notice: Subject to any disclaimer, the term of this patent is extended or adjusted under 35 U.S.C. 154(b) by 184 days.

(21) Appl. No.: 12/664,781

(22) PCT Filed: Jan. 15, 2009

(86) PCT No.: PCT/JP2009/000116
§ 371 (c)(1),
(2), (4) Date: Dec. 15, 2009

(87) PCT Pub. No.: WO2010/082230
PCT Pub. Date: Jul. 22, 2010

(65) Prior Publication Data
US 2011/0225808 A1  Sep. 22, 2011

(51) Int. Cl.
*H01M 4/82* (2006.01)
(52) U.S. Cl. .......... 29/623.1; 29/592; 29/592.1
(58) Field of Classification Search .......... 29/623, 29/623.1
See application file for complete search history.

(56) References Cited

FOREIGN PATENT DOCUMENTS

| JP | 11-176424 | | 7/1999 |
|----|-----------|---|--------|
| JP | 2001-006663 | | 1/2001 |
| JP | 2001-029860 | | 2/2001 |
| JP | 2001-068100 | | 3/2001 |
| JP | 2001-293414 | | 10/2001 |
| JP | 2003-145007 | | 5/2003 |
| JP | 2003-187788 | | 7/2003 |
| JP | 2005-211871 | | 8/2005 |
| JP | 2005211871 A | * | 8/2005 |
| JP | 2008-218079 | | 9/2008 |

* cited by examiner

*Primary Examiner* — Barbara Gilliam
*Assistant Examiner* — Gary Harris
(74) *Attorney, Agent, or Firm* — McDermott Will & Emery LLP

(57) ABSTRACT

An electrode plate precursor on which an active material layer is formed by applying an active material onto at least one surface of a current collector in a lengthy belt shape by means of a die comprising a paste storing part where a paste containing the active material is accumulated and a discharge flow path discharging the above paste from the paste storing part. A plan view configuration of the discharge flow path is adjusted by adjusting a plan view configuration of thin plate-like members that are arranged respectively on both end portions of the discharge flow path so that the active material layer formed in the process has a uniform thickness throughout the entire length in the width direction of the electrode plate precursor.

3 Claims, 7 Drawing Sheets

METHOD FOR MANUFACTURING ELECTRODE PLATE FOR BATTERY

RELATED APPLICATIONS

This application is the U.S. National Phase under 35 U.S.C. §371 of International Application No. PCT/JP2009/000116, filed on Jan. 15, 2009, the disclosure of which is incorporated by reference herein.

TECHNICAL FIELD

The present invention relates to a method for manufacturing an electrode plate for a battery. More specifically, the present invention relates to a method for manufacturing suitably an electrode plate for a battery in which problems arising in an application step for applying an active material onto a current collector in a belt shape are solved.

BACKGROUND ART

In recent years, there has been a rapid advancement in realizing portable and cordless electronic apparatuses such as audio-visual apparatuses, personal computers and portable communication equipment. Conventionally, aqueous type batteries such as nickel cadmium batteries and nickel-metal-hydride batteries have been used as power sources for driving these electronic apparatuses. In recent years, however, non-aqueous electrolyte batteries represented by lithium ion secondary batteries that can be charged rapidly and have both high volume energy density and high weight energy density have become a mainstream of batteries used as such power sources. On the other hand, the nickel cadmium batteries and the nickel-metal-hydride batteries mentioned above are used as power sources for driving cordless power tools and electric vehicles that require heavy load characteristics, and higher capacity and higher large-current discharge characteristics are needed.

An electrode plate for the above-mentioned types of batteries is usually manufactured by applying an electrode active material in a slurry form onto a current collector made of a metal foil or a porous metal plate having a lengthy belt shape and drying the same to form an active material layer. The current collector on which an active material layer is formed (hereinafter, a current collector on which an active material layer is formed is referred to as an electrode plate precursor) is rolled with rollers, for example, to have a prescribed thickness, and then subjected to a slit processing to have a prescribed width and cut into a prescribed length to complete an electrode plate for a battery.

Herein, as shown in FIGS. 12 to 14, there are several embodiments of an electrode plate precursor which is a current collector on which an active material layer is formed. In FIG. 12, an active material layer 32 is formed by applying uniformly an active material onto a current collector 31. In FIG. 13, by applying intermittently an active material onto a current collector 31, a plurality of active material applied portions 32A are aligned with a prescribed pitch in the longitudinal direction of an electrode plate precursor (current collector 31) with active material unapplied portions 33 sandwiched between each thereof, thereby constituting an active material layer 32 (so-called intermittent application). In FIG. 14, by applying an active material in a stripe form onto a current collector 31 by dividing the same in the width direction, strips of applied portions 32B are aligned in the width direction of an electrode plate precursor (current collector 31) to form an active material layer 32 (so-called stripe application).

In any of these embodiments, active material unapplied portions 35 are formed on both sides in the width direction of the electrode plate precursor. Since these unapplied portions 35 are portions that are cut off at the time of cutting the electrode plate precursor to manufacture an electrode for a battery, the smaller the width thereof is made, the more the material loss can be reduced. Therefore, it is preferable to minimize the width of the unapplied portions 35. However, even when the width of the unapplied portions 35 is minimized, if the flatness of the active material layer 32 or that of the active material applied portions 32A and 32B, in particular the flatness in the width direction of the electrode plate precursor is not ensured, it is necessary to cut off both end portions in the width direction of the electrode plate precursor including both end portions of the active material layer 32 and the like for a reason described later. In consequence, the material loss cannot be reduced in case the flatness of the active material layer 32 and the like is not ensured.

It is to be noted that an active material unapplied portion is formed on both sides in the width direction of the electrode plate precursor because when a paste mainly composed of an active material is applied while a current collector in a lengthy belt shape is guided to the longitudinal direction, there is a limit in the precision of the application position because the current collector sometimes meanders slightly. Also, there is a possibility that the paste after the application bulges out to the width direction because of sag (state where the application form of the paste cannot be maintained because of low viscosity or low thixotropy) and the like.

Then, these years, in the above-described rolling process, the density of the applied active material is further increased by increasing pressure force in order to give a battery a higher capacity. This rolling deforms the electrode plate precursor. Herein, there is no problem as long as the deformation of the electrode plate precursor in the rolling process is such that the decrease in the thickness is due to uniform extension along the surface direction and is balanced. Otherwise, various problems and quality defects may be caused.

For example, there arise problems such as a "bend" in which an electrode plate precursor after the rolling has a protrusion on one of its surfaces, and a "crease" in which irregular roughness is produced on the current collector of an electrode plate precursor after the rolling. Problems of bends or creases lead to difficulties in winding up the electrode plate precursor in a coil form.

Herein, the reason why the electrode plate precursor is not extended uniformly along the surface direction is that the active material applied portions and unapplied portions are present on the electrode plate precursor. For example, in the case where the rolling is performed by guiding the electrode plate precursor in a belt shape to the longitudinal direction so as to pass it through a pair of rollers, pressure force is applied to only the active material applied portions and hardly any pressure force is applied to unapplied portions on both sides in the width direction of the electrode plate precursor. As in this case, when there is a difference in pressure force applied to the electrode plate precursor between the active material applied portions and unapplied portions, a difference in extension between the two is produced, and this difference in extension may produce creases or cuts in the boundary between the applied portions and the unapplied portions.

Also, in the case where deformation caused by the rolling is only due to deformation along the surface direction of the electrode plate precursor, if the deformation is not uniform between both sides in the width direction, a "warpage" in which the electrode plate precursor after the rolling bends to right and left is produced. When such a warpage is produced, a "winding displacement" in which the electrode plate is displaced to the axis direction of a core member is caused at the time of constituting an electrode plate group by winding in a spiral form an electrode plate for a battery produced through the above-described slit processing etc. Further, in the case where the binding force of the active material applied onto the current collector cannot catch up with extension of the current collector by the rolling, a "crack" is formed on the surface of the active material layer. An electrode plate for a battery in which a crease or a crack is formed on the electrode plate precursor readily causes separation of the active material, and manufacture of batteries using such an electrode plate for a battery may result in severe quality defects, particularly in the case of manufacturing lithium ion secondary batteries.

Herein, the application of the active material onto the current collector is generally carried out by using a die (see e.g. Patent Documents 1 and 2). The die comprises a manifold (a paste storing part) for storing a paste supplied by a paste supplying means, and a slit (a flat discharge flow path) for discharging the paste from the manifold (see FIG. 1 of Patent Document 1). Also, when the paste comprising the active material is applied onto the current collector by using the die, it is necessary to block so that the paste does not bulge out to the width direction of the current collector. For this reason, as shown in FIG. 15, both edge portions in the width direction of the active material layer 32 may be raised depending on the viscosity and the thixotropy of the paste. In this case, stress is concentrated onto these portions at the time of the rolling, which may result in cuts. For this reason, as described in Patent Document 3, not only the active material unapplied portions but also both end portions of the applied portions are cut off, and in this case, a material loss of an expensive active material is caused.

On the other hand, in the case where a paste of an active material having a high fluidity is applied at the time of applying the active material, a cross section of the active material layer in the width direction after the application often has such a shape that the thickness is decreased as approaching both ends, as shown in FIG. 16. In the case where an electrode plate for a battery is produced by rolling the electrode plate precursor having such a shape and then performing a slit processing into a prescribed width, an electrode plate for a battery cut out from both end portions readily causes a warpage. Further, since the active material layer 32 of the electrode plate for a battery cut out from both end portions has a smaller thickness than that of an electrode plate for a battery cut out from the central portion of the electrode plate precursor, in case a battery is produced by using the electrode plate for a battery cut out from both end portions, the battery has a smaller capacity. From this viewpoint, an electrode plate for a battery cut out from both end portions of an electrode plate precursor where both end portions in the width direction of the active material layer 32 are raised has the active material layer 32 having a larger thickness, and a battery using this has a larger battery capacity.

In consequence, in the case where flatness in the width direction of the active material layer 32 on the electrode plate precursor is not ensured, the electrode plate for a battery cut out from both end sides of the electrode plate precursor cannot be used for producing a battery and is thrown away. As a result, the material loss is increased.

Patent Document 1: Japanese Laid-Open Patent Publication No. 2001-293414

Patent Document 2: Japanese Laid-Open Patent Publication No. 2003-187788

Patent Document 3: Japanese Laid-Open Patent Publication No. Hei 11-176424

Patent Document 4: Japanese Laid-Open Patent Publication No. 2003-145007

DISCLOSURE OF THE INVENTION

Problem to be Solved by the Invention

As described above, if the thickness of the active material layer in the width direction of the electrode plate precursor is not uniform to both ends in the width direction, various problems arise at the time of rolling the same.

Specifically, the amount of the paste discharged from the die is generally controlled by a supplying pressure of the paste from the paste supplying means, a gap of slits, and properties such as the viscosity and the thixotropy of the paste. Also, the amount of the paste to be applied to the current collector is decided according to application conditions such as a rate of guiding the current collector and a distance between the discharge outlet of the die and the current collector.

Patent Document 1 proposes to make a gap of the slit (discharge flow path) at both end portions of the die smaller than a gap at the central portion so as to prevent rising of both ends in the width direction of the applied portion. However, as described above, in the case where a paste having a low viscosity and a low thixotropy is applied, the tendency that the thickness of the applied portion is decreased as approaching both ends in the width direction is accelerated.

In order to prevent such difficulties, as described in Patent Document 4 for example, it is conceived to control the flow amount of the paste in each section by constituting the gap of the slit adjustable by sections aligned in the width direction of the slit (see FIG. 4 of Patent Document 4), thereby to obtain flat active material applied portions throughout the entire length in the width direction of the electrode plate precursor.

However, since it is necessary to control the flow amount of the paste in each section of the slit while monitoring application results, the mechanism becomes complex and the manufacture cost is increased. Also, if the mechanism becomes complex, the possibility that a breakdown occurs is increased, and the production efficiency is lowered for maintenance thereof.

From this viewpoint, although Patent Document 2 aims at ensuring flatness in the width direction of the applied portions with a die having a simple structure, it does not describe a specific means for controlling desired application conditions by using the above die. Also, in Patent Document 2, raised portions are formed at both end portions in the width direction of the electrode plate precursor by applying the active material so that the application thickness of the active material is thicker than other portions, and only these raised portions are preliminary rolled to obtain active material applied portions that are flat throughout the entire length in the width direction of the electrode plate precursor. However, if the application thickness at both end portions in the width direction is increased as this, a difference in the density of the active material is produced even if a preliminary rolling is carried out to make the apparent thickness even. Further, there is a high possibility that such a difference in the density causes a warpage in the electrode plate cut out after the rolling. Also, this difference in the density creates unevenness in the battery capacity. In consequence, it is impossible to produce a battery using the electrode plate at these portions.

The present invention is made in view of the problems described above and has an object to provide a method for manufacturing an electrode plate for a battery wherein an electrode plate precursor in which active material applied portions on the current collector have a uniform thickness throughout the entire length in the width direction thereof with a simple constitution even in the case where a paste comprising an active material having various properties is used, and by this, it is possible to decrease material disposal rates for preventing quality defects caused at the step of rolling the electrode plate precursor and unevenness in the battery capacity between the products, thereby enabling improvements in the production efficiency and reduction in the material loss.

Means for Solving the Problem

In order to achieve the above object, the present invention provides a method for manufacturing an electrode plate for a battery comprising a step of manufacturing an electrode plate precursor by causing a paste comprising an active material to pass through a die comprising a paste storing part and a subsequent flat discharge flow path so as to apply the paste onto at least one surface of a current collector in a lengthy belt shape thereby to form an active material layer, wherein the above die comprises un upper mold having a flat bottom surface and a lower mold having a flat top surface, and the above upper mold and the above lower mold are disposed in opposition to each other sandwiching between thereof a pair of thin plate-like members determining the above discharge flow path in the width direction thereby to form the above discharge flow path, and wherein a gap of the above discharge flow path is adjusted by a thickness of the above thin plate-like members and an application width of the above paste is adjusted by a distance between the above pair of thin plate-like members at an opening of the above discharge flow path.

In a preferred embodiment of the present invention, a plan view configuration of the above pair of thin plate member is adjusted so that the active material layer to be formed has a uniform thickness throughout the entire length in the width direction of the electrode plate precursor.

In another preferred embodiment of the present invention, the above paste is applied by adjusting the plan view configuration of the above thin plate-like members so that the width of the discharge flow path is gradually increased from the above paste storing part toward the above opening, thereby to prevent rising of end portions of the active material layer in the width direction of the above electrode plate precursor.

In still another preferred embodiment of the present invention, the above paste is applied by adjusting the plan view configuration of the above thin plate-like members so that the width of the discharge flow path is gradually decreased from the above paste storing part toward the above opening and the above width is increased just before the above opening, thereby to prevent the thickness of the active material layer from decreasing gradually at end portions in the width direction of the electrode plate precursor.

Also, the above thin plate-like members can be adhered to at least one of the upper mold and the lower mold to be interposed between the upper mold and the lower mold, and the thin plate-like members made of steel may be used.

Effect of the Invention

According to the present invention, the gap of the discharge flow path and the application width of the paste can be adjusted with a simple constitution of only adjusting the thickness of a pair of thin plate-like members interposed between the upper mold and the lower mold so that they determine the flat discharge flow path in the width direction, and adjusting the distance between the thin plate-like members at the opening of the discharge flow path.

Also, according to a preferred embodiment of the present invention, a flat active material layer having a uniform thickness throughout the entire length in the width direction of the electrode plate precursor can be formed by a simple operation of adjusting a plan view configuration of a pair of thin plate-like members corresponding to properties of a paste comprising an active material and application conditions.

By this, in the case of carrying out a rolling step for compressing the electrode plate precursor after the application step, it is possible to prevent occurrence of defects such as cuts or warpages in the electrode plate precursor.

Also, in order to prevent occurrence of such defects, there is no need to cut off both end portions in the width direction of the electrode plate precursor including the both end portions of the active material layer having an uneven thickness. Therefore, the material loss can be reduced and an increase in the number of steps can be prevented.

BEST MODE FOR CARRYING OUT THE INVENTION

The present invention relates to a method for manufacturing an electrode plate for a battery comprising a step of manufacturing an electrode plate precursor by causing a paste comprising an active material to pass through a die comprising a paste storing part and a subsequent flat discharge flow path so as to apply the paste onto at least one surface of a current collector in a lengthy belt shape thereby forming an active material layer. Herein, the die comprises an upper mold having a flat bottom surface and a lower mold having a flat top surface that determine a gap of the discharge flow path. Also, the die is so constituted that the upper mold and the lower mold thereof are disposed in opposition to each other sandwiching a pair of thin plate-like members that determine the discharge flow path in the width direction. Herein, a gap of the discharge flow path is adjusted by the thickness of the thin plate-like members and an application width of the paste is adjusted by a distance between the pair of thin plate-like members at the opening of the discharge flow path.

Also, in the present invention, a plan view configuration of the pair of thin plate-like members is so adjusted that the active material layer to be formed has a uniform thickness throughout the entire length in the width direction of the electrode plate precursor.

In this manner, by applying the active material so that the active material layer has a uniform thickness throughout the entire length in the width direction of the electrode plate precursor, various problems arising in the rolling process afterwards can be avoided, and also the material loss can be reduced. Further, by performing an adjustment for this by adjusting the plan view configuration of the thin plate-like members that determine the flat discharge flow path in the width direction and not by adjusting the configuration of the die itself, it is possible to apply the paste using one die notwithstanding unevenness of the properties such as the viscosity and the thixotropy etc. of the paste so that the active material layer has a uniform thickness throughout the entire length in the width direction of the electrode plate precursor.

That is, it is possible to form an active material layer having a uniform thickness throughout the entire length in the width direction of the electrode plate precursor corresponding to paints having various properties and application conditions only by changing the thin plate-like members without changing the die itself.

Figure 15:
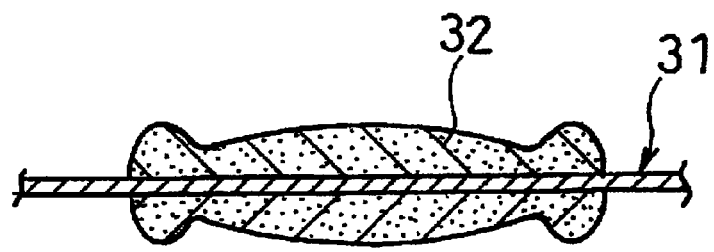
FIG. 15 is a lateral sectional view of an electrode plate precursor on which an active material layer is formed so that both ends thereof are raised.
Figure 16:
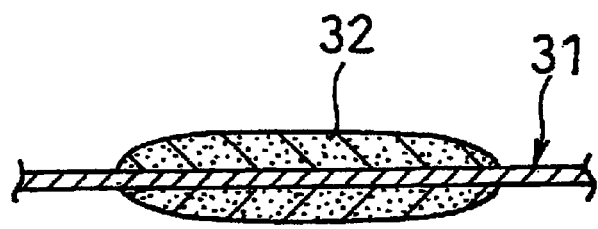
FIG. 16 is a lateral sectional view of an electrode plate precursor on which an active material layer is so formed that both ends thereof in the width direction are thinner.

More specifically, an active material is generally applied onto a current collector as a paint in a paste form. Properties concerning the viscosity and the thixotropy etc. of a paste change greatly according to solid matter percentages etc. in the paste. For this reason, depending on the properties of the paste, the active material layer may be raised at both end portions in the width direction of the electrode plate precursor as shown in FIG. 15, or the thickness of the active material layer may be decreased gradually at both end portions in the width direction of the electrode plate precursor as shown in FIG. 16.

When both end portions of the active material layer are raised, extension of the electrode plate precursor by the rolling at the raised portions is larger than that of the other portion. As a result, cuts may be produced at the boundary with the other portion. Therefore, in order to prevent occurrence of such defects, it is necessary to roll the electrode plate precursor after cutting both edge portions in the width direction of the electrode precursor including the raised portions. This causes a material loss.

Also, after the rolling step, a cutting step is carried out to cut an electrode plate precursor into a prescribed width in order to manufacture an electrode plate for use in individual batteries from a rolled electrode plate precursor. On the other hand, a removing step for removing both end portions in the width direction of the electrode plate precursor is carried out before the rolling step. Therefore, it is necessary to carry out the above removing step separately in addition to the above cutting step. In consequence, the number of steps is increased.

On the other hand, in the case where the thickness of the active material layer is decreased gradually at both end portions in the width direction of the electrode plate precursor, extension by the rolling of the electrode plate precursor cut out from these portions after the rolling is different between the right side and the left side in the width direction. This produces a warpage in the electrode plate precursor. The electrode plate precursor in which a warpage is produced in this manner cannot be used as a product and is thrown away. This generates a considerable material loss.

Therefore, by applying the electrode active material so that the active material layer has a uniform thickness up to both end portions in the width direction of the electrode plate precursor, the problems described above i.e. occurrence of defects such as warpages or cuts and generation of material loss can be decreased. Also, the increase in the number of steps can be inhibited.

Further, in the present invention, in the case where end portions of the active material layer in the width direction of the electrode plate precursor are raised on account of properties of the paint containing the active material (see FIG. 15), the plan view configuration of the thin plate-like members is so adjusted that the width of the discharge flow path is increased gradually from the paste storing part toward the opening.

Figure 6:
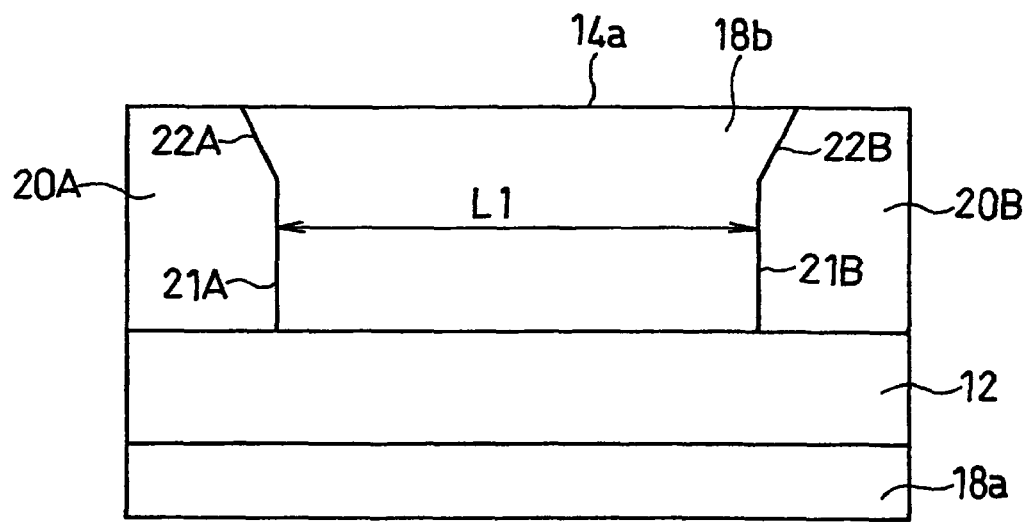
FIG. 6 is a plan view of a lower mold showing a design example of a plan view configuration of thin plate-like members in one embodiment of the present invention.

For example, in the case where a paste having a viscosity of 70,000 mPa·sec or more after a gauge head No. 6 rotor is rotated for one minute at 20 rpm using a B type viscosimeter (Brookfield type viscosimeter) is applied, both end portions of the active material layer in the width direction of the electrode plate precursor are often raised. In such a case, as shown in FIG. 6, the plan view configuration of the thin plate-like members is so adjusted that the plan view configuration of the discharge flow path has a constant width from the paste storing part up to a position on the way to the opening, and the width is gradually increased on both sides from the position on the way up to the opening. By this, rising of both end portions of the active material layer in the width direction of the electrode plate precursor can be prevented.

Figure 7:
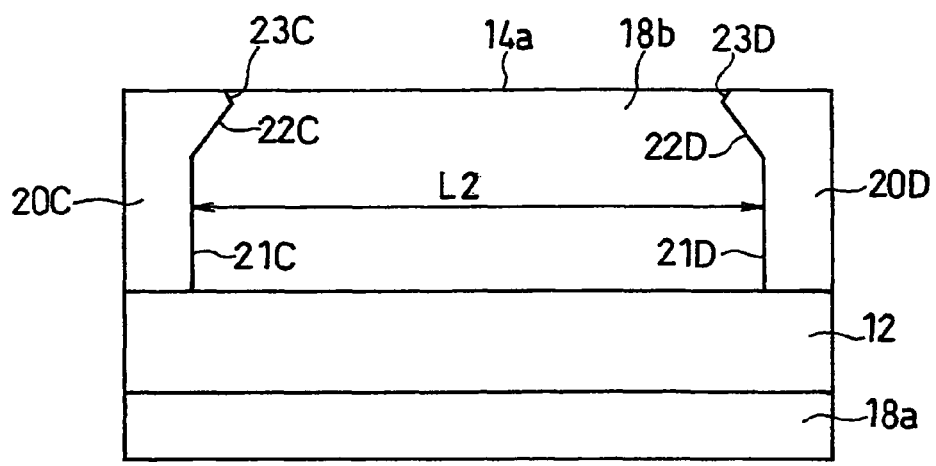
FIG. 7 is a plan view of a lower mold showing another design example of a plan view configuration of thin plate-like members according to one embodiment of the present invention.

Also, in the case where a paste having a viscosity of 40,000 mPa·sec or less after a gauge head No. 6 rotor is rotated for one minute at 20 rpm using a B type viscosimeter (Brookfield type viscosimeter) is applied, the thickness of the active material layer is often decreased gradually at both end portions in the width direction of the electrode plate precursor. In such a case, as shown in FIG. 7, the plan view configuration of the thin plate-like members is so adjusted that the plan view configuration of the discharge flow path has a constant width from the paste storing part up to a position on the way to the opening, and the width is gradually decreased from the position on the way up to the opening, and the width is increased just before the opening. In the case of decreasing the width of the discharge flow path toward the opening, a paste that flows parallel toward the opening collides with a paste that flows along the thin plate-like members near the opening to generate turbulent flows and thus the application at both end portions in the width direction is not stable. Therefore, it is necessary to adjust the plan view configuration of the thin plate-like members so that the width of the discharge flow path is slightly increased just before the opening. By this, it is possible to prevent the thickness of the active material layer from decreasing gradually at both end portions in the width direction of the electrode plate precursor.

Embodiment 1

In the following, an embodiment of the present invention will be described with reference to drawings.

Figure 1:
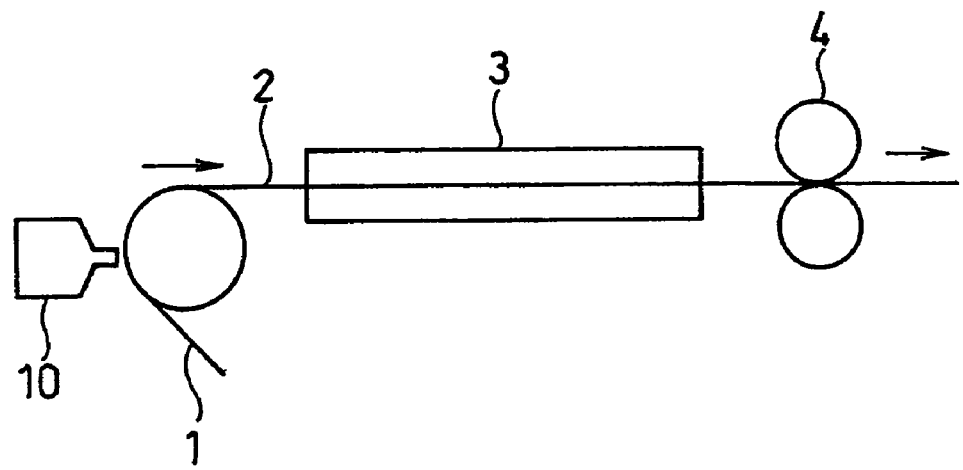
FIG. 1 is a side view of a manufacturing apparatus to which a method for manufacturing an electrode plate for a battery according to one embodiment of the present invention is applied.

FIG. 1 is a schematic view showing a method for manufacturing an electrode plate for a lithium ion secondary battery. In an example as shown in the figure, while guiding a current collector 1 in a lengthy belt shape toward the longitudinal direction, a paste comprising an electrode active material is applied onto a current collector 1 by means of a die 10 to produce an electrode plate precursor 2 in which an active material layer is formed. This is rolled by rollers 4 after being dried by a dryer 3. The electrode plate precursor 2 thus rolled is cut into a prescribed size for use in individual batteries thereby to complete an electrode plate.

In the case where the electrode plate is for the positive electrode, a paste formed by kneading and dispersing a positive electrode active material, a binder, a conductive agent, and as necessary a thickener in a liquid component is applied onto one surface or both surfaces of the current collector 1 made of an aluminum foil or a foil further subjected to a lath processing or an etching treatment.

The positive electrode active material is not particularly restricted, and for example lithium containing transition metal compounds accepting lithium ions as guest can be used. For example, preferably used are composite metal oxides of at least one metal selected from cobalt, manganese, nickel, chromium, iron and vanadium with lithium, $LiCoO_2$, $LiMnO_2$, $LiNiO_2$, $LiCo_xNi_{(1-x)}O_2$ ($0<x<1$), $LiCo_xNi_yMn_{(1-x-y)}O_2$ ($0<X+Y<1$), $LiFePO_4$, $LiNi_xCo_yAl_{(1-x-y)}O_2$ ($0<X+Y<1$), $LiCrO_2$, $\alpha LiFeO_2$, $LiVO_2$ and the like.

The binder is not particularly restricted as long as it can be dissolved or dispersed in the liquid component of the paste, and for example a fluorine based binder, acrylic rubber, denatured acrylic rubber, styrene-butadiene rubber (SBR), acrylic based polymer, vinyl based polymer and carboxymethyl cellulose can be used singly or in combination of two or more thereof as a mixture or a copolymer. As the fluorine based binder, preferably used are polyvinylidene fluoride, a copolymer of vinylidene fluoride and hexafluoropropylene and a dispersion of polytetrafluoroethylene resin.

As the conductive agent, acetylene black, graphite and carbon fiber can be preferably used singly or in a mixture of two or more of them. As the thickener, ethylene-vinyl alcohol copolymer, carboxymethyl cellulose, methyl cellulose etc. are preferable. These thickeners are used when the liquid component of the paste is water.

As the liquid component, suitably used are those that can dissolve or disperse the binder, and in the case of dissolving the binder, a single substance or a mixture of N-methyl-2-pyrrolidone, N,N-dimethyl formamide, tetrahydrofuran, dimetyl acetoamide, dimethyl sulfoxide, hexamethyl sulforamide, tetramethyl urea, acetone, methyl ethyl ketone and the like is preferable. Also, in the case of dispersing the binder in water or hot water, it is preferable to use in combination with a thickener.

In the case where the electrode plate is for the negative electrode, a paste formed by kneading and dispersing a negative electrode active material, a conductive agent, a binder and as necessary a thickener in a solvent or a dispersant is applied onto one surface or both surfaces of a current collector 1 made of a copper foil or a foil further subjected to a lath processing or an etching treatment.

The negative electrode active material is not particularly restricted, and for example carbon materials obtained by baking organic polymer compounds (phenol resin, polyacrylonitril, cellulose etc.), carbon materials obtained by baking coke or pitch, artificial graphite, natural graphite and the like can be used in a spherical, scaly or lump shape.

As for the binder and the thickener added as necessary, the same binder and the thickener as in the positive electrode plate can be used. Further, as the conductive agent, carbon materials having finer particles can be used. Also, the thickener is used when the liquid component of the paste is water.

It is to be noted that, in the present invention, the method for manufacturing a mixture in a paste form by kneading and dispersing the active material, the conductive agent, the binder and as necessary the thickener is not particularly restricted, and for example a planetary mixer, a homomixer, a pinmixer, a kneader, a homogenizer and the like can be used. It is possible to use these singly or in combination.

Also, it is possible to add a dispersant, a surfactant, a stabilizer etc. can be added as necessary at the time of mixing and dispersing the above mixture in a paste form.

Figure 2:
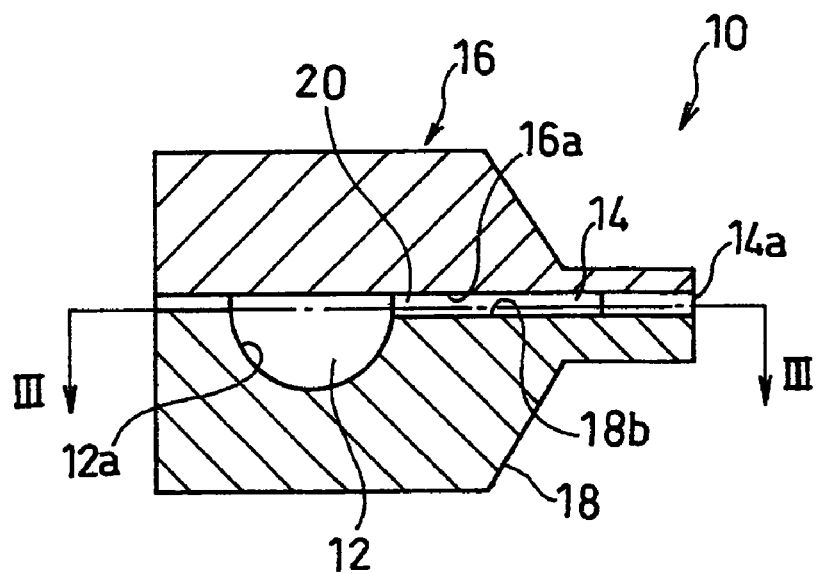
FIG. 2 is a sectional view showing a schematic constitution of a die used in the apparatus of FIG. 1
Figure 3:
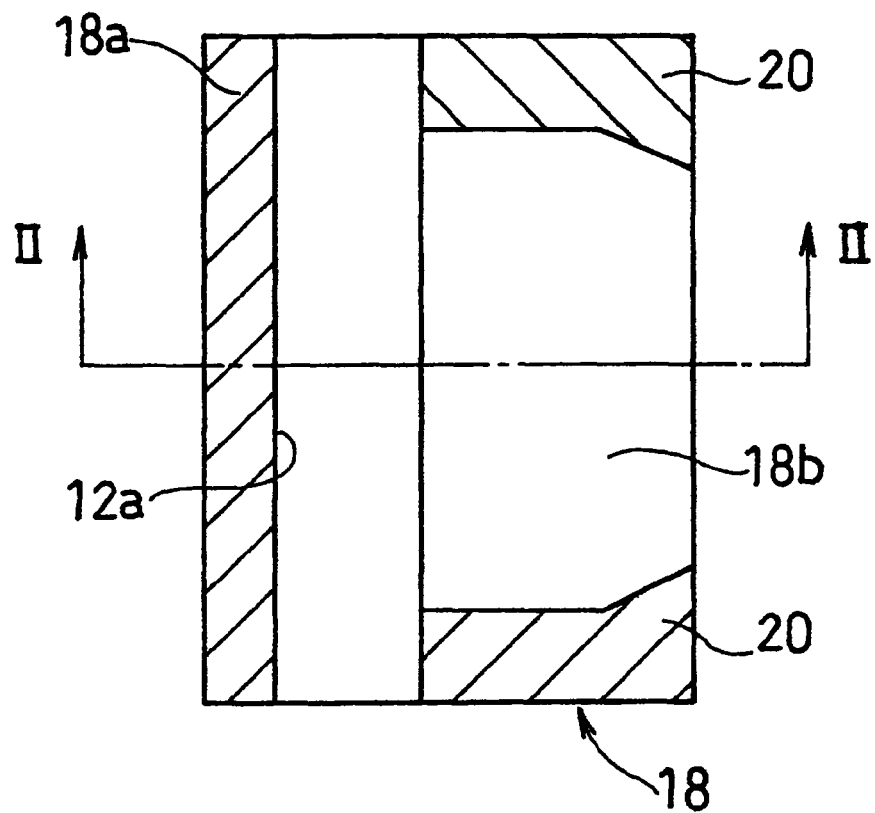
FIG. 3 is a sectional view by line I-I in FIG. 2.
Figure 4:
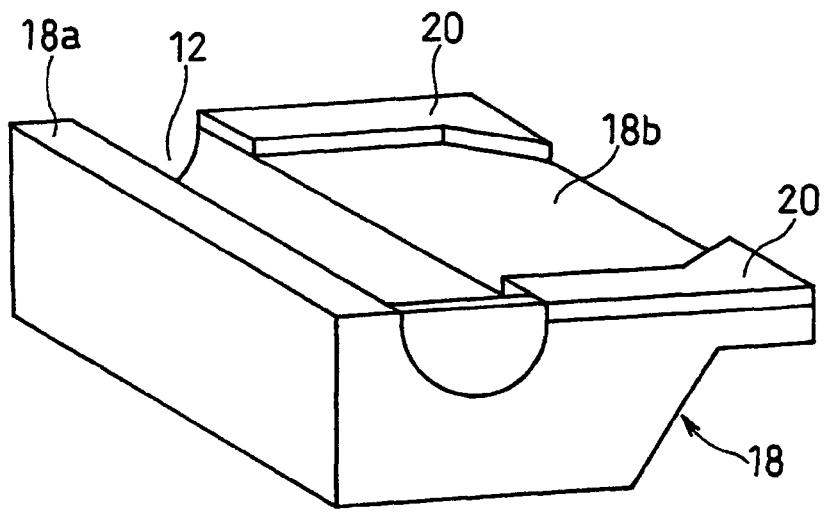
FIG. 4 is a perspective view of a lower mold constituting the die.

FIG. 2 shows a schematic constitution of the die by a sectional view (sectional view by line II-II of FIG. 3). FIG. 3 shows a sectional view by line III-III of FIG. 2. FIG. 4 shows a perspective view of a lower mold of the die.

A die 10 comprises a paste storing part 12 into which a paste comprising an active material is introduced, and a flat discharge flow path 14 for discharging out the paste inside the paste storing part 12. Herein, both ends of the active material layer correspond to both ends of an opening 14a of the discharge flow path 14.

More specifically, the die 10 is constituted by an upper mold 16 and a lower mold 18 each having a roughly rectangular plan view configuration. A bottom surface 16a of the upper mold 16 facing the lower mold 18 is a flat plan. On a surface of the lower mold 18 facing the upper mold 16, a groove 12a having a semicircle cross section and constituting the paste storing part 12 is formed. The groove 12a crosses the lower mold 18 perpendicular to the discharge direction of the paste, and one of its openings is closed. At a portion of the lower mold 18 adjacent to the groove 12a on the surface facing the upper mold 16 (portion opposite to the discharge flow path 14), a close-contact part 18a that is in close contact with the bottom surface 16a of the upper mold 16 is formed. On the other side of the groove 12a of the above surface, a flow path determining surface (top surface) 18b that forms the discharge flow path 14 with the bottom surface 16a of the upper mold 16 is formed.

The gap and the plan view configuration of the discharge flow path 14 are determined by a pair of thin plate-like members 20 disposed at both side end portions of the top surface 18b. That is, the discharge flow path 14 is defined and constituted by the bottom surface 16a of the upper mold 16, the top surface 18b of the lower mold 18, and the thin plate-like members 20 on both sides.

Figure 5:
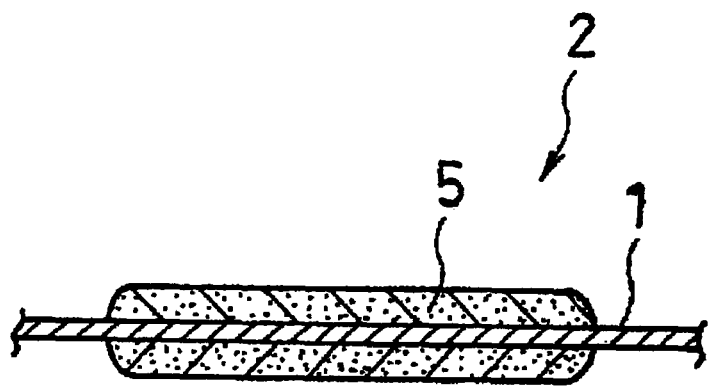
FIG. 5 is a sectional view of an electrode plate precursor onto which an active material is applied to form an active material layer.

Herein, the thin plate-like members 20 are, for example, constituted by thin plates of stainless steel and the thickness thereof is set corresponding to a desired gap of the discharge flow path 14. Also, the plan view configuration thereof is designed corresponding to properties of the paste so that an active material layer 5 (see FIG. 5) formed by the paste applied onto the current collector 1 with the die 10 has a uniform thickness and is flat up to both end portions in the width direction of the electrode plate precursor 2.

FIGS. 6 and 7 show design examples of the plan view configuration of the thin plate-like members. FIG. 6 shows a design example in the case of using a paste having properties that both end portions of the applied active material 5 in the width direction of the electrode plate precursor 2 tend to rise (see FIG. 15) (paste having a viscosity measured by the above method of 70,000 mPa·sec or more). In the example as shown, straight portions 21A and 21B are formed respectively on thin plate-like members 20A and 20B on both sides so that a width L1 of the discharge flow path 14 is fixed from the paste storing part 12 up to a position on the way to the opening 14a.

Then, inclined parts 22A and 22B are formed on the thin plate-like members 20A and 20B respectively so that the width L1 of the discharge flow path 14 is increased on both sides at the same ratio from the position on the way up to the opening 14a. In such a manner, a pressure of the paste discharged at both end portions of the opening 14a is reduced by adjusting the plan view configuration of the thin plate-like members 20A and 20B so that the width L1 of the discharge flow path 14 is fixed from the paste storing part 12 up to a position on the way to the opening 14a and the width L1 is increased from the position on the way toward the opening 14a. By this, it is possible to prevent rising of the active material layer 5 at both end portions in the width direction of the electrode plate precursor.

On the other hand, FIG. 7 is a design example of a case using a paste having properties that the thickness of the active material layer tends to be decreased gradually at both end portions in the width direction of the electrode plate precursor (see FIG. 16) (paste having a viscosity measured by the above method of 40,000 mPa·sec or less). In the example as shown, straight portions 21C and 21D are formed respectively on thin plate-like members 20C and 20D on both sides so that a width L2 of the discharge flow path 14 is fixed from the paste storing part 12 up to a position on the way to the opening 14a.

Then, inclined portions 22C and 22D are formed on the thin plate-like members 20C and 20D respectively so that the width L2 of the discharge flow path 14 is decreased on both sides at the same ratio from the position on the way up to a position immediately before the opening 14a. Then, reverse-inclined portions 23C and 23D are formed on the thin plate-like members 20C and 20D respectively so that the width L2 is increased on both sides at the same ratio from the position immediately before the opening 14a up to the opening 14a.

In such a manner, a pressure of the paste discharged at both end portions of the opening 14a is increased by adjusting the plan view configuration of the thin plate-like members 20C and 20D so that the width L2 of the discharge flow path 14 is fixed from the paste storing part 12 up to a position on the way to the opening 14a and the width L2 is decreased from the position on the way toward the position immediately before the opening 14a. By this, it is possible to prevent a gradual decrease in the thickness of the active material layer at both end portions of the active material layer in the width direction of the electrode plate precursor. Further, by adjusting the plan view configuration of the thin plate-like members 20C and 20D so that the width L2 is increased on both sides at the same ratio from the position immediately before the opening 14a up to the opening 14a, it is also possible to prevent edges at both end portions of the active material layer from rising.

Example 1

Examples of the present invention will be described in the following. It should be noted that the present invention is not limited to the following examples.

First, 100 parts by weight of lithium cobaltate as a positive electrode active material, 3 parts by weight of acetylene black as a conductive agent, 4 parts by weight in solid content of polyvinylidene fluoride (PVDF) as a binder were kneaded and dispersed in N-methyl-2-pyrrolidone (N-methylpyrrolidone: NMP) as a solvent to prepare a paste. At this time, the viscosity when a gauge head No. 6 rotor was rotated for one minute at 20 rpm using a B type viscosimeter was 74,800 mPa·sec.

The above paste was applied onto a current collector using a die in which a paste storing part and a flat discharge flow path are formed between an upper mold and a lower mold as shown in FIG. 2. At this time, since both end portions of the active material layer in the width direction of the electrode plate precursor may possibly be raised with the above-described viscosity of the paste, the plan view configuration of the thin plate-like members was adjusted so that the plan view configuration of the discharge flow path has a fixed width (390 mm) from the paste storing part up to a position on the way to the opening, and the width was increased gradually on both sides from the position on the way up to the opening, as shown in FIG. 6. At this time, the width of the opening was 400 mm.

Also, the current collector was an aluminum foil having a thickness of 20 μm and was subjected to an intermittent application so that unapplied portions of 10 mm were made thereon at an interval of 450 mm while it was made to run at a fixed rate.

Figure 8:
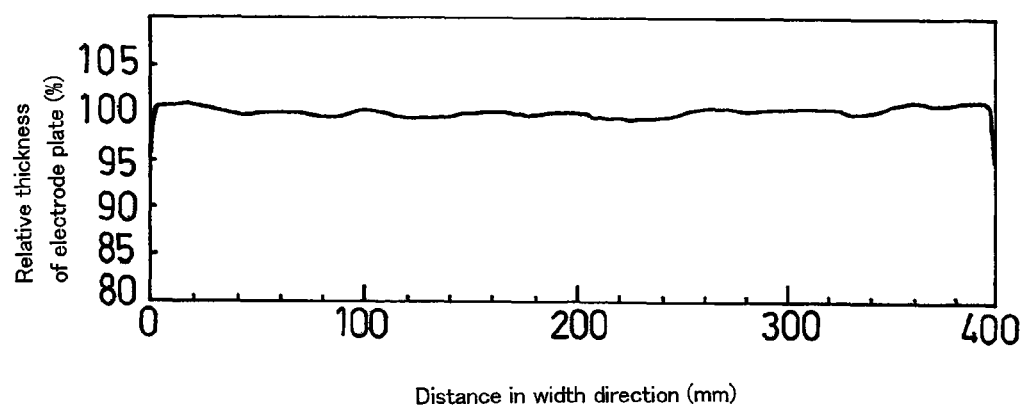
FIG. 8 is a graph showing thickness distribution in the width direction of an electrode plate in Example 1 of the present invention.

Then, it was dried for 10 minutes in a drying furnace while the temperature was increased from 80 to 130° C. in sequence and distribution of thicknesses of the obtained electrode plate as a whole in the width direction of the electrode plate is shown in FIG. 8. That is, the average value of the thickness of the electrode plate (sum of the thickness of the current collector and the thickness of the active material layer) at the middle portion which was 40 to 360 mm away from one end portion of the electrode plate was 310 μm. On the other hand, the average values of the electrode plate at portions near both ends which were respectively 5 to 40 mm and 360 to 395 away from one end portion of the electrode plate were 311 and 308 μm respectively. In this manner, the thickness of the electrode plate at portions near both ends could be made almost the same as the thickness at the middle portion. It is to be noted that FIG. 8 shows distribution of relative thicknesses of the electrode plate when the average thickness of the electrode plate at the middle portion is 100%. The same thing can be said with regard to FIGS. 9 to 11.

Comparative Example 1

The same paste as in Example 1 was applied onto a current collector using a die in which a paste storing part and a flat discharge flow path were formed between an upper mold and a lower mold as shown in FIG. 2. At this time, the plan view configuration of the thin plate-like members was adjusted so that the plan view configuration of the discharge flow path has a fixed width (400 mm) from the paste storing part up to a position on the way to the opening. Except for this, an electrode plate was produced in the same manner as in Example 1.

Figure 9:
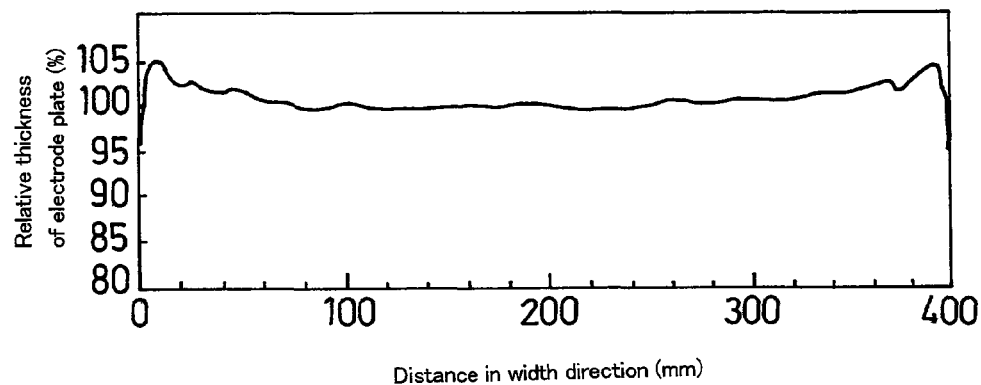
FIG. 9 is a graph showing thickness distribution in the width direction of an electrode plate in Comparative Example 1 of the present invention.

At this time, distribution of thicknesses of the electrode plate as a whole in the width direction of the electrode plate is shown in FIG. 9. That is, the average value of the thickness of the electrode plate at the middle portion which was 40 to 360 mm away from one end portion of the electrode plate precursor was 310 μm. On the other hand, the average values of the electrode plate at portions near both ends which were respectively 5 to 40 mm and 360 to 395 away from one end portion of the electrode plate were 315 and 316 μm respectively. In consequence, the thickness of the electrode plate near both the end portions was 5 to 6 μm (about 2%) larger than the thickness of the electrode plate at the middle portion of the electrode plate precursor.

Example 2

First, in the same manner as in Example 1, 100 parts by weight of lithium cobaltate as a positive electrode active material, 3 parts by weight of acetylene black as a conductive agent, 4 parts by weight in solid content of polyvinylidene fluoride (PVDF) as a binder were kneaded and dispersed in N-methyl-2-pyrrolidone (N-methylpyrrolidone: NNP) as a solvent to prepare a paste. At this time, the viscosity when a gauge head No. 6 rotor was rotated for one minute at 20 rpm using a B type viscosimeter was 35,100 mPa·sec.

The above paste was applied onto a current collector using a die in which a paste storing part and a flat discharge flow path are formed between an upper mold and a lower mold as shown in FIG. 2. At this time, since the thickness of the active material layer may possibly be decreased gradually at both end portions of the active material layer in the width direction of the electrode plate precursor with the above-described viscosity of the paste, the plan view configuration of the thin plate-like members was adjusted so that the width of the discharge flow path was fixed (408 mm) from the paste storing part up to a position on the way to the opening, and the width was decreased from the position on the way toward a position immediately before the opening, and further the width was increased by only 1 mm on both sides from the position immediately before the opening up to the opening, as shown in FIG. 7. At this time, the width of the opening was 400 mm.

Also, the current collector was an aluminum foil having a thickness of 20 μm and it was subjected to an intermittent application so that unapplied portions of 10 mm were made at an interval of 450 mm while it was made to run at a fixed rate.

Figure 10:
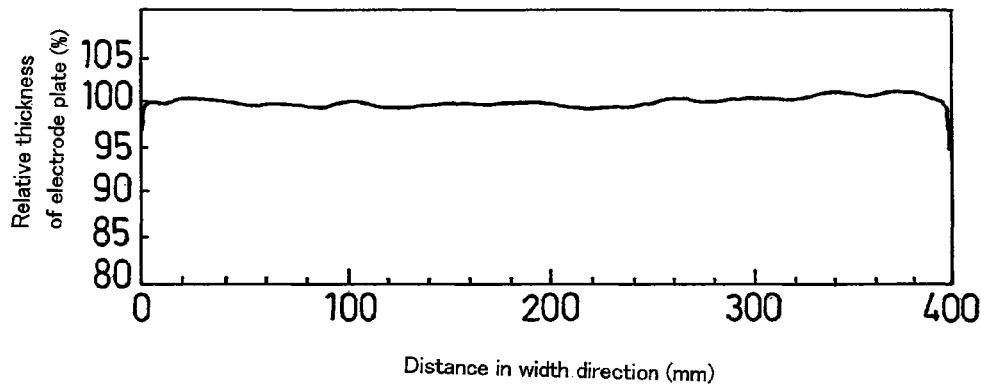
FIG. 10 is a graph showing thickness distribution in the width direction of an electrode plate in Example 2 of the present invention.

Then, it was dried for 10 minutes in a drying furnace while the temperature was increased from 80 to 130° C. in sequence and distribution of thicknesses of the obtained electrode plate as a whole in the width direction of the electrode plate is shown in FIG. 10. That is, the average value of the thickness of the electrode plate at the middle portion which was 40 to 360 mm away from one end portion of the electrode plate was 310 μm. On the other hand, the average values of the electrode plate at portions near both ends which were respectively 5 to 40 mm and 360 to 395 μm away from one end portion of the electrode plate was 309 and 308 μm respectively. In this manner, the thickness of the electrode plate at portions near both ends could be made almost the same as the thickness at the middle portion.

Comparative Example 2

The same paste as in Example 2 was applied onto a current collector using a die in which a paste storing part and a flat discharge flow path were formed between an upper mold and a lower mold as shown in FIG. 2. At this time, the plan view configuration of the thin plate-like members was adjusted so that the plan view configuration of the discharge flow path has a fixed width (400 mm) from the paste storing part up to a position on the way to the opening. Except for this, an electrode plate was produced in the same manner as in Example 1 except for this.

Figure 11:
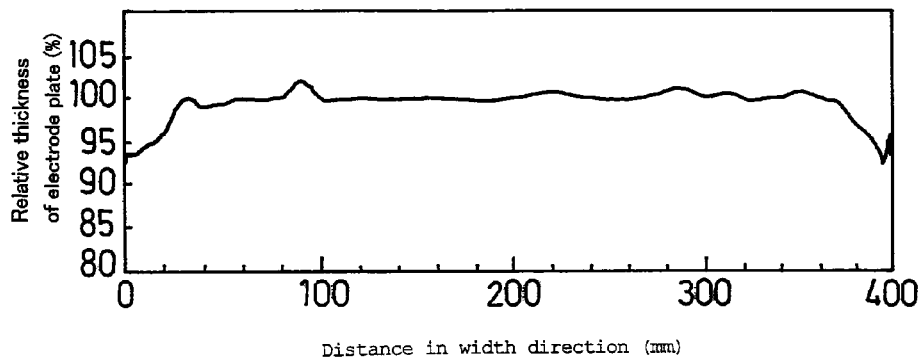
FIG. 11 is a graph showing thickness distribution in the width direction of an electrode plate in Comparative Example 2 of the present invention.
Figure 12:
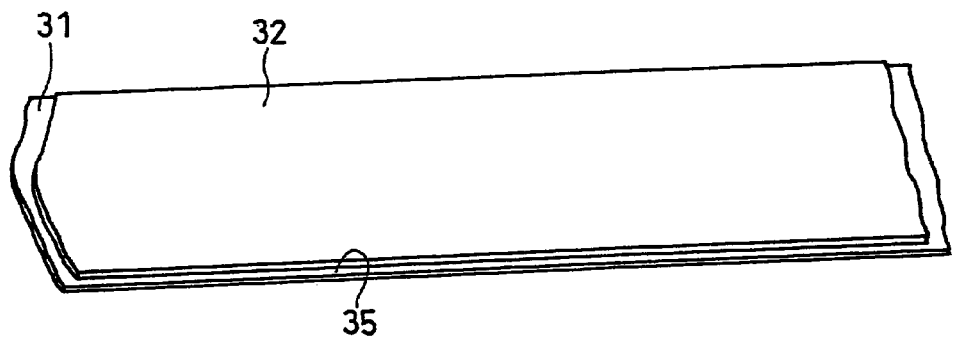
FIG. 12 is a perspective view of an electrode plate precursor on which an active material layer is formed uniformly.
Figure 13:
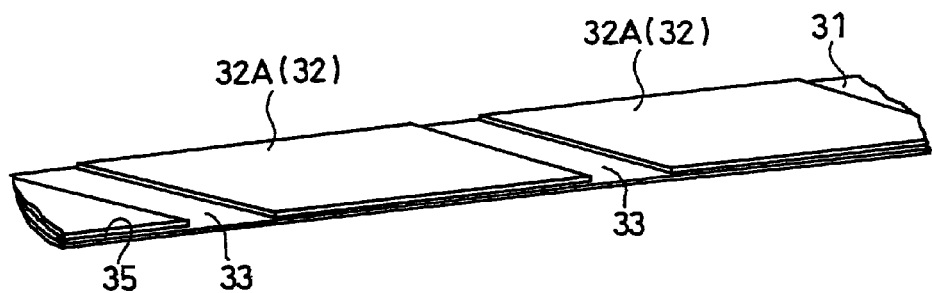
FIG. 13 is a perspective view of an electrode plate precursor on which an active material layer is formed intermittently in the longitudinal direction.
Figure 14:
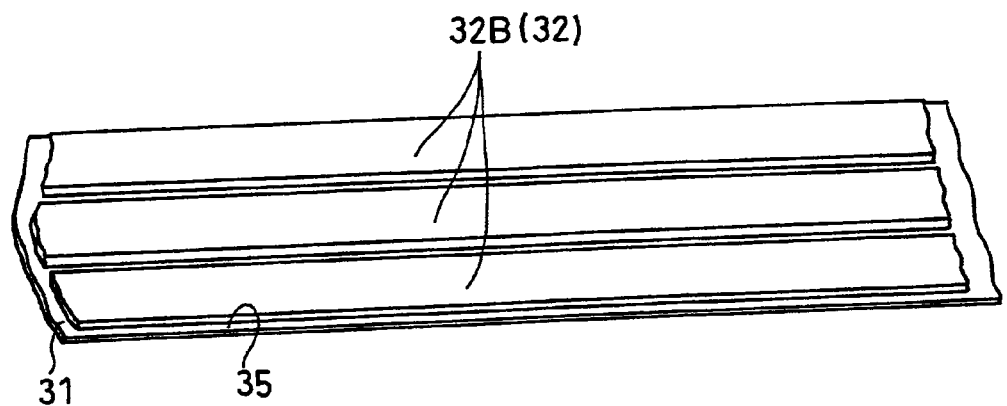
FIG. 14 is a perspective view of an electrode plate precursor on which an active material layer is so formed that they are divided in the width direction.

At this time, distribution of thicknesses of the electrode plate as a whole in the width direction of the electrode plate is shown in FIG. 11. That is, the average value of the thickness of the electrode plate at the middle portion which was 40 to 360 mm away from one end portion of the electrode plate precursor was 310 μm. On the other hand, the average values of the electrode plate at portions near both ends which were respectively 5 to 40 mm and 360 to 395 away from one of the end portion of the electrode plate were 304 and 305 μm respectively. In consequence, the thickness of the electrode plate near both end portions was 5 to 6 μm (about 2%) smaller than the thickness of the electrode plate at the middle portion of the electrode plate precursor.

As described above, in the present invention, it was confirmed that a flat active material layer having a uniform thickness throughout the entire length in the width direction of the electrode plate precursor can be formed by a simple operation of only adjusting the plan view configuration of the thin plate-like members regardless of the viscosity of the paste.

INDUSTRIAL APPLICABILITY

The method for manufacturing an electrode plate for a battery according to the present invention can improve production efficiency of the battery because it can decrease occurrence ratio of defects such as creases or warpages produced at the time of rolling the electrode plate precursor for compressing the active material layer.

The invention claimed is:

1. A method for manufacturing an electrode plate for a battery comprising a step of applying a paste comprising an active material onto at least one surface of a current collector in a lengthy belt shape by causing said paste to pass through a die including a paste storing part and a subsequent flat discharge flow path,
  wherein said die comprises:
    an upper mold having a flat bottom surface and a lower mold having a flat top surface that are opposed to each other to determine a gap of said discharge flow path, and
    a pair of plate members sandwiched between said upper mold and said lower mold to determine said discharge flow path in a width direction, and
  wherein (i) when viscosity of said paste is 70,000 mPa·sec or more, said paste is applied with the die having the plate members whose configuration is adjusted so that a width of said discharge flow path is gradually increased from said paste storing part toward said opening, and
    (ii) when viscosity of said paste is 40,000 mPa·sec or less, said paste is applied with the die having the plate members whose configuration is adjusted so that a width of said discharge flow path is decreased gradually from said paste storing part toward said opening and said width is increased before said opening.

2. The method for manufacturing an electrode plate for a battery in accordance with claim 1, wherein said plate members are adhered to at least one of said upper mold and said lower mold to be interposed between said upper mold and said lower mold.

3. The method for manufacturing an electrode plate in accordance with claim 1, wherein said plate members comprise steel.

* * * * *